[12] United States Patent  
Takeda et al.

(10) Patent No.: US 11,184,896 B2  
(45) Date of Patent: Nov. 23, 2021

(54) USER TERMINAL, RADIO BASE STATION, AND RADIO COMMUNICATION METHOD FOR OPERATING WITH NON-ANCHOR CARRIERS IN NARROWBAND INTERNET OF THINGS

(71) Applicant: NTT DOCOMO, INC., Tokyo (JP)

(72) Inventors: Kazuaki Takeda, Tokyo (JP); Naoto Ookubo, Tokyo (JP); Jiahui Liu, Beijing (CN); Qin Mu, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/301,520

(22) PCT Filed: Aug. 10, 2017

(86) PCT No.: PCT/JP2017/029218  
§ 371 (c)(1),  
(2) Date: Nov. 14, 2018

(87) PCT Pub. No.: WO2018/030538  
PCT Pub. Date: Feb. 15, 2018

(65) Prior Publication Data  
US 2019/0182822 A1   Jun. 13, 2019

(30) Foreign Application Priority Data

Aug. 11, 2016   (CN) .......................... 201610659887.4

(51) Int. Cl.  
*H04W 72/04*   (2009.01)  
*H04W 68/00*   (2009.01)  
(Continued)

(52) U.S. Cl.  
CPC ........... *H04W 72/048* (2013.01); *H04L 67/12* (2013.01); *H04W 48/10* (2013.01); *H04W 68/00* (2013.01);  
(Continued)

(58) Field of Classification Search  
CPC . H04W 72/048; H04W 74/006; H04W 72/04; H04W 48/10; H04W 68/00;  
(Continued)

(56) References Cited

U.S. PATENT DOCUMENTS

2013/0051214 A1   2/2013 Fong et al.  
2017/0238292 A1*  8/2017 Rico Alvarino ....... B65D 88/32  
                                                                370/329

(Continued)

FOREIGN PATENT DOCUMENTS

CN   107666709 A   2/2018  
EP   3493613 A1    6/2019  
(Continued)

OTHER PUBLICATIONS

Extended European Search Report issued in 17839602.4 dated Jan. 7, 2019 (11 pages).

(Continued)

*Primary Examiner* — Walli Z Butt  
(74) *Attorney, Agent, or Firm* — Osha Bergman Watanabe & Burton LLP

(57) ABSTRACT

The present invention provides a method for allowing user terminal to acquire information about paging physical resource blocks (PRBs), a method of allowing a base station to indicate information about paging PRBs to UE, a method of allowing UE to determine allocation of paging PRBs, a method of allowing a base station to allocate paging PRBs, a base station and UE. The above method of allowing user terminal to acquire information about paging physical (Continued)

resource blocks (PRBs) includes detecting an anchor PRB, reading information carried by the anchor PRB, and acquiring information about the non-anchor paging PRBs associated with the anchor PRB based on the information carried by the anchor PRB. By this method, non-anchor paging PRBs can be specified to the UE.

4 Claims, 5 Drawing Sheets

(51) Int. Cl.
    *H04W 48/10*     (2009.01)
    *H04W 74/00*     (2009.01)
    *H04L 29/08*     (2006.01)
    *H04W 68/02*     (2009.01)

(52) U.S. Cl.
    CPC ........... *H04W 68/02* (2013.01); *H04W 72/04* (2013.01); *H04W 72/0453* (2013.01); *H04W 74/006* (2013.01)

(58) Field of Classification Search
    CPC ............. H04W 72/0453; H04W 68/02; H04W 72/042; H04L 67/12
    See application file for complete search history.

(56) References Cited

U.S. PATENT DOCUMENTS

2018/0020432 A1* 1/2018 Rico Alvarino .... H04W 72/048
2019/0166578 A1* 5/2019 Chang ................... H04W 68/06
2019/0239051 A1* 8/2019 Hwang ................... H04W 4/80

FOREIGN PATENT DOCUMENTS

WO     2011/038243 A2     3/2011
WO     2011/038243 A3     7/2011

OTHER PUBLICATIONS

ZTE; "New WI proposal on further enhancement of cellular IoT for LTE"; 3GPP TSG RAN Meeting #72, RP-161175; Busan, Korea; Jun. 13-16, 2016 (7 pages).
International Search Report issued in PCT/JP2017/029218 dated Oct. 31, 2017 (2 pages).
Written Opinion of the International Searching Authority issued in PCT/JP2017/029218 dated Oct. 31, 2017 (3 pages).
Vodafone et al.; "New work item proposal: Enhancements of NB-IoT"; 3GPP TSG RAN Meeting #72, RP-161324; Busan, Korea; Jun. 13-16, 2016 (9 pages).
ZTE; "Motivation for further enhancement of cellular IoT for LTE"; 3GPP TSG RAN Meeting #72, RP-161176; Busan, South Korea; Jun. 13-16, 2016 (3 pages).
NTT DOCOMO; "Initial views on the paging on non-anchor PRB for Rel-14 NB-IoT"; 3GPP TSG RAN WG1 Meeting #86, R1-167353; Gothenburg, Sweden; Aug. 22-26, 2016 (4 pages).
Office Action issued in European Application No. 17839602.4; dated Apr. 26, 2021 (6 pages).
Office Action issued in Chinese Application No. 201780037254.2; dated May 27, 2021 (13 pages).

* cited by examiner

USER TERMINAL, RADIO BASE STATION, AND RADIO COMMUNICATION METHOD FOR OPERATING WITH NON-ANCHOR CARRIERS IN NARROWBAND INTERNET OF THINGS

TECHNICAL FIELD

The present disclosure relates to the field of mobile communications. More particularly, the present disclosure relates to a method for allowing user terminal (User Equipment (UE)) to acquire information about paging physical resource blocks (PRBs), a method for allowing a base station to indicate information about paging PRBs to UE, a method for allowing UE to determine allocation of paging PRBs, a base station and UE.

BACKGROUND ART

Generally speaking, in an narrowband internet of things (NB-IoT), paging transfer is performed so that a broadcast channel is transmitted only in anchor PRBs. However, it then follows that too much paging traffic concentrates in anchor PRBs, and the load on anchor PRBs overflows. Therefore, by providing non-anchor PRBs as paging PRBs (that is, as non-anchor paging PRBs), the paging traffic in anchor PRBs is unloaded, and the load on anchor PRBs is reduced.

SUMMARY OF INVENTION

Technical Problem

However, how to indicate non-anchor PRBs to UEs has not yet been discussed, and how to allocate paging PRBs to UEs has not yet been discussed either. Therefore, there is a demand for a method for indicating paging PRBs to UEs and determining allocation of paging PRBs.

Solution to Problem

One aspect of the present invention provides a user terminal for NB-IoT, having a receiving section that receives information about non-anchor carriers that are associated with an anchor carrier, and, in this user terminal, the receiving section receives a paging configuration in the non-anchor carriers.

One embodiment of the present disclosure provides a method for allowing user terminal to acquire information about paging physical resource blocks (PRBs), and this method includes detecting an anchor PRB, reading information carried by the anchor, and acquiring information about non-anchor paging PRBs associated with the anchor PRB based on the information carried by the anchor.

In the method of this embodiment, acquiring information about non-anchor paging PRBs associated with the anchor PRB based on information carried by the anchor PRB includes acquiring the number of paging PRBs and offset values for non-anchor paging PRBs from information carried by the anchor PRB, and these offset values are the offset values of non-anchor paging PRBs with respect to a reference frequency.

In the method of this embodiment, the information carried by the anchor PRB includes a flag that indicates whether or not non-anchor PRBs are provided as paging PRBs, and acquiring the information about non-anchor paging PRBs associated with the anchor PRB based on information carried by the anchor PRB includes, acquiring information about non-anchor paging PRBs associated with the anchor paging PRB based on predetermined rules when the flag indicates that non-anchor paging PRBs are provided.

In the method of this embodiment, the predetermined rules include acquiring the locations of non-anchor paging PRBs associated with the anchor PRB based on the number of predetermined paging PRBs and the offset values of non-anchor paging PRBs with respect to a reference frequency.

Another embodiment of the present disclosure provides user terminal, which includes a detection section arranged to detect an anchor physical resource block (PRB), a reading section arranged to read information carried by the anchor PRB, and an acquiring section arranged to acquire information about non-anchor paging PRBs associated with the anchor PRB based on information carried by the anchor PRB.

According to the UE of this embodiment, the acquiring section acquires the number of paging PRBs and offset values for non-anchor paging PRBs from information carried by the anchor PRB, and the above offset values are the offset values of non-anchor paging PRBs with respect to a reference frequency.

According to the UE of this embodiment, the information carried by the anchor PRB includes a flag that indicates whether or not non-anchor PRBs are provided as paging PRBs, and when the flag indicates that non-anchor paging PRBs are provided, the acquiring section acquires the information about non-anchor paging PRBs associated with the anchor PRB based on predetermined rules.

According to the UE of this embodiment, the predetermined rules include acquiring the locations of non-anchor paging PRBs associated with the anchor PRB based on the number of predetermined paging PRBs and the offset values of non-anchor paging PRBs with respect to a reference frequency.

Another embodiment of the present disclosure provides a method for allowing a base station to indicate information about paging physical resource blocks (PRBs) to user terminal, and this method includes configuring information that specifies non-anchor paging PRBs that are associated with an anchor PRB, and transmitting the above specifying information in the anchor PRB.

In the method of this embodiment, configuring information that specifies non-anchor paging PRBs associated with the anchor PRB includes placing the number of paging PRBs and the offset values of non-anchor paging PRBs in the specifying information, and the offset values are the offset values of non-anchor paging PRBs with respect to a reference frequency.

In the method of this embodiment, the specifying information includes a flag that indicates whether or not non-anchor PRBs are provided as paging PRBs.

In the method of this embodiment, according to predetermined rules, the non-anchor paging PRBs associated with the anchor PRB are determined based on a predetermined number of paging PRBs and the offset values of non-anchor paging PRBs with respect to a reference frequency.

Another embodiment of the present disclosure provides a base station, which includes a configuration section arranged to configure information specifying non-anchor paging PRBs associated with an anchor physical resource block (PRB), and a transmitter/receiver arranged to transmit the specifying information in the anchor PRB.

In the base station of this embodiment, the configuration section places the number of paging PRBs and the offset values of the non-anchor paging PRBs in the specifying information, and the offset values are the offset values of non-anchor paging PRBs with respect to a reference frequency.

In the base station of this embodiment, the specifying information includes a flag that indicates whether or not non-anchor PRBs are provided as paging PRBs.

In the base station of this embodiment, the configuration section determines, based on predetermined rules, the non-anchor paging PRBs associated with the anchor PRB based on the number of paging PRBs determined in advance, and the offset values of non-anchor paging PRBs with respect to a reference frequency.

Another embodiment of present disclosure provides a method for allowing user terminal to determine allocation of paging physical resource blocks (PRBs), and this method includes generating the paging PRB indices of multiple paging PRBs, and determining the paging PRBs allocated to the UE, among a plurality of paging PRBs, based on associations between the UE and paging PRB indices in mapping.

In the method of this embodiment, determining the paging PRB that are allocated to the UE, among a plurality of paging PRBs based on associations between the UE and paging PRB indices in mapping includes, acquiring the indicator of the UE (UE_ID) and the number N of paging PRBs, calculating a result in which N is the modulus in UE_ID, and determining the paging PRB indices based on the result.

In the method of this embodiment, determining the paging PRB indices based on the result includes dividing the result by a weight and determining the paging PRB indices based on the value given by dividing the result by the weight, and the weight is assigned by the base station.

Another embodiment of the present disclosure provides user terminal, which includes an index generation section arranged to generate paging PRB indices for a plurality of paging physical resource blocks (PRBs), and a determining section arranged to determine the paging PRBs allocated to the UE, among a plurality of paging PRBs, based on associations between the UE and paging PRB indices in mapping.

In the UE of this embodiment, the determining section acquires the indicator of the UE (UE_ID) and the number N of paging PRBs, calculates a result in which N is the modulus in UE_ID, and determines the paging PRB indies based on this result.

In the UE of this embodiment, the determining section divides the result by a weight, and determines the paging PRB indices based on the value given by dividing the result by the weight, and the weight is assigned by the base station.

Another embodiment of present disclosure provides a method for allowing a base station to allocate paging physical resource blocks (PRBs), and this method includes generating paging PRB indices for multiple paging PRBs and allocating paging PRBs based on associations between the user terminal and paging PRB indices in mapping.

In the method of this embodiment, allocating paging PRB based on associations between the UE and paging PRB indices in mapping includes acquiring the indicator of the UE (UE_ID) and the number N of paging PRBs, calculating a result in which N is the modulus in UE_ID, and assigning paging PRB indices based on the result.

In the method of this embodiment, assigning paging PRB indices based on the result includes dividing the result by a weight and acquiring the paging PRB indices that are assigned, based on the value given by dividing the result by the weight, and the weight is assigned by the base station.

Another embodiment of the present disclosure provides a base station, which includes an index generation section arranged to generate paging PRB indices for a plurality of paging physical resource blocks (PRBs), and an allocation section arranged to allocate paging PRBs based on associations between user terminal and paging PRB indices in mapping.

In the base station according to this embodiment, the allocation section acquires the indicator of the UE (UE_ID) and the number N of paging PRBs, calculates a result in which N is the modulus in UE_ID, and assigns paging PRB indices based on the result.

In the base station according to this embodiment, the allocation section divides the result by a weight, and acquires the paging PRB indices that are assigned, based on the value given by dividing the result by the weight, and the weight is assigned by the base station.

BRIEF DESCRIPTION OF DRAWINGS

Now, with reference to the accompanying drawings, embodiments of the present disclosure will be described in further detail to clarify the above-described contents of the present disclosure, as well as other objects, features and advantages. The drawings are provided to further understand the embodiments of the present disclosure, considered part of the specification, and used to interpret the present disclosure along with the embodiments of the present disclosure, without limiting the present disclosure. In the accompanying drawings, the same reference numerals indicate the same elements or steps.

DESCRIPTION OF EMBODIMENTS

Now, exemplary embodiments of the present disclosure will be described below in detail, with reference to the accompanying drawings, to further clarify the objects, technical solutions, and advantages of the present disclosure. Obviously, it should be understood that the embodiments described below are only part of the embodiments of the present disclosure, and do not represent all of the embodiments of the present disclosure, and the present disclosure is by no means limited to the exemplary embodiments described herein. Any other embodiments which a person skilled in the art can derive from the embodiments of the present disclosure described herein without requiring creative effort are all within the scope of protection of the present disclosure.

Now, the technical concept of the present disclosure will be explained below in relationship to NB-IoT. However, a person skilled in the art should understand that the technical concept of the present disclosure can be applied to various communication systems.

Figure 1:
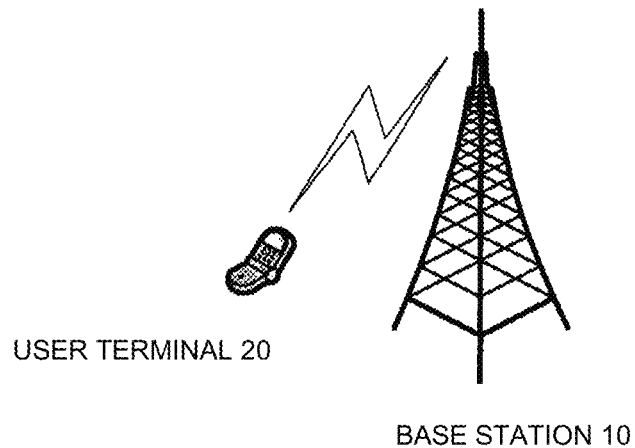
FIG. 1 is a schematic diagram to show an NB-IoT system, to which embodiments of the present disclosure can be applied.

FIG. 1 is a schematic diagram to show an NB-IoT system, where embodiments of the present disclosure can be applied. As shown in FIG. 1, this NB-IoT system includes a base station 10 and user equipment 20, where the base station 10 transmits broadcast information to the user equipment 20, and the user equipment 20 receives and detects the broadcast information, and performs the applicable operations. In this system, the base station 10 and the user equipment 20 communicate via, for example, the 180 kHz band. Note that non-anchor PRBs may be provided as paging physical resource blocks (PRBs) in the system.

Now, embodiments of the present disclosure will be described below with reference to the accompanying drawings.

According to the first embodiment of the present disclosure, a base station indicates paging PRBs to UE directly. According to a second embodiment of the present disclosure, rules are defined in advance between a base station and UE, and the UE determines paging PRBs based on these rules.

To be more specific, in NB-IoT, multiple pieces of information such as system information can be transferred/carried in anchor PRBs. The system information includes one or more system information blocks (SIBs), such as the master information block (MIB) and SIB 1 to SIB9. According to the embodiments of the present disclosure, information that is transferred in anchor PRBs indicates paging PRBs to UE.

Figure 2:
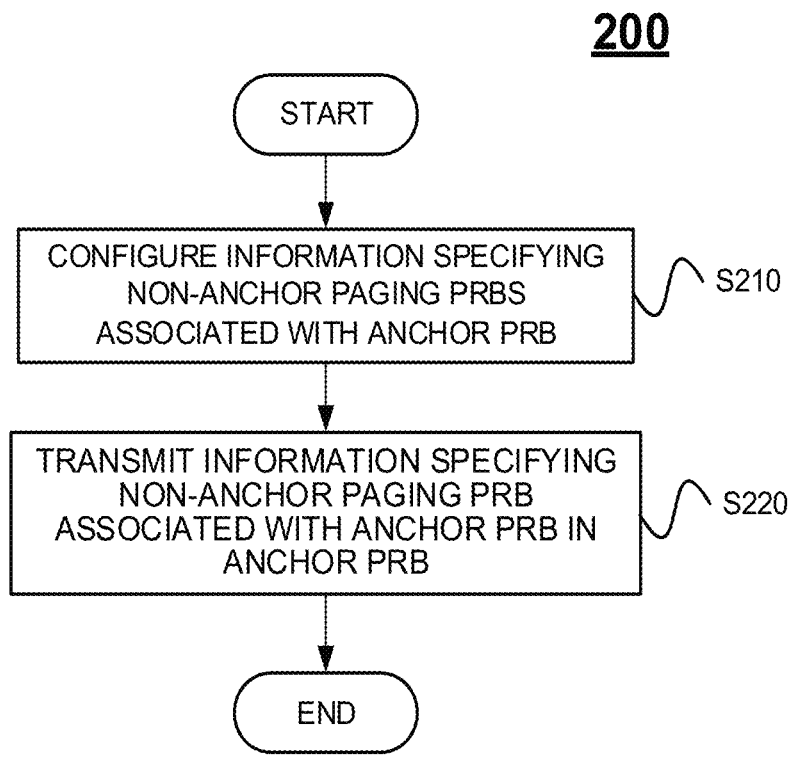
FIG. 2 is a schematic flowchart to show a method for allowing a base station to indicate information about paging PRBs to UE, according to a first embodiment of the present disclosure.

FIG. 2 is a schematic flowchart to show a method 200 for allowing a base station to indicate information about paging PRBs to UE, according to the first embodiment of the present disclosure. This method is executed by the base station.

As shown in FIG. 2, information to specify non-anchor paging PRBs that are associated with an anchor PRB is configured in S210. In the first embodiment, in SIB 2, the base station configures the number of paging PRBs and offset values for non-anchor paging PRBs, and an offset value here is an offset value for a non-anchor paging PRB with respect to a reference frequency.

With the present embodiment, whether or not to include an anchor PRB in paging PRBs is decided in advance between the base station and UE. In one example, paging PRBs include an anchor PRB and non-anchor paging PRBs, and, in this case, the base station configures offset values for a number of non-anchor paging PRBs to match the number of paging PRBs minus one. In another example, paging PRBs include only non-anchor paging PRBs, and, in this case, the base station configures offset values for a number of non-anchor paging PRBs to match the number of paging PRBs. In either case, the UE can detect the anchor PRB by itself, so that, when the base station transmits information about non-anchor paging PRBs associated with the anchor PRB, the UE can know all the paging PRBs.

Note that the reference frequency is an arbitrary frequency that the UE can determine (or know) in advance, such as the frequency of the anchor PRB, the frequency of the DC tone, and/or other predetermined frequencies.

In one example, the reference frequency is the frequency of the anchor PRB, and, in relationship to this, the offset value a non-anchor paging PRB is the offset value of the non-anchor PRB with respect to the anchor PRB, and therefore the location of the non-anchor paging PRB can be determined based on the location of the anchor PRB and the offset value of the non-anchor paging PRB relative to that location.

In another example, the reference frequency is the frequency of the DC tone, and, in relationship to this, the offset value for a non-anchor paging PRB is the offset value of the non-anchor paging PRB with respect to the DC tone, and therefore the location of the non-anchor paging PRB can be determined based on the location of the DC tone and the offset value of the non-anchor paging PRB relative to that location. In this example, five-bit information to indicate the offset value of the anchor PRB with respect to the DC tone is additionally included in the MIB, so that the location of each non-anchor paging PRB with respect to the anchor PRB can be calculated based on this information.

The offset values (offsets) can be represented based on various schemes.

In one example, the number of PRBs is used as the unit when representing offset values. In this case, offset values may be represented using positive values or negative values. The positive/negative sign indicates whether or not a non-anchor paging PRB is on the higher frequency side or on the lower frequency side with respect to the reference frequency on the frequency axis, and the absolute value of an offset value indicates the number of PRBs between a non-anchor paging PRB and the reference frequency. Since the size of bandwidth occupied in each PRB is fixed, the UE can calculate the frequency location of each non-anchor paging PRB based on the offset value. Alternatively, according to another example, the number of PRBs between non-anchor paging PRBs that are located on a predetermined side (the higher frequency side or the lower frequency side) of the reference frequency, and the reference frequency, may be represented, without dividing the offset values into positive values and negative values. In another example, whether an offset value is positive or negative may be expressed using another piece of information (for example, one bit).

In another example, an offset value may be expressed based on the difference in frequency. In this case, the offset value of a non-anchor paging PRB may be the difference between the frequency of the non-anchor paging PRB and the reference frequency. The positivity or the negativity of an offset value shows whether or not the non-anchor paging PRB is on the higher frequency side or on the lower frequency side with respect to the reference frequency on the frequency axis, and its absolute value indicates the frequency gap between the non-anchor paging PRB and the reference frequency.

Figures 3A, 3B:
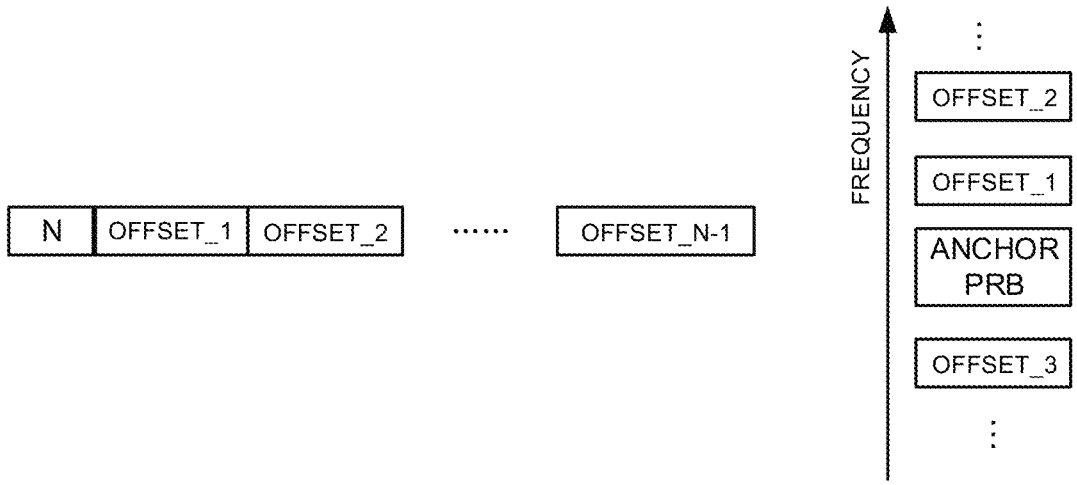
FIG. 3A is a diagram to show a method of configuring the number of paging PRBs and each offset value in SIB 2, according to an embodiment of the present disclosure.
FIG. 3B is a diagram to show the location of each non-anchor paging PRB relative to an anchor PRB on the frequency axis.

FIG. 3A is a diagram to show the method of configuring the number of paging PRBs and each offset value in SIB 2 according to an embodiment of the present disclosure. As shown in FIG. 3A, in SIB 2, the number N of paging PRBs, and offset values Offset_1, Offset_2, and Offset_N−1 of each non-anchor paging PRB with respect to the reference frequency are configured. Offset values Offset_1, Offset_2, and Offset_N−1 can be arranged in various orders. For example, Offset values Offset_1, Offset_2, and Offset_N−1 can be arranged in ascending or descending order of the frequencies of non-anchor paging PRBs, in ascending or descending order of magnitude of absolute values of offset values or distance from non-anchor paging PRBs to the reference frequency (for example, the anchor PRB or the DC tone), in random order, or in any other suitable order. It should be noted that, since FIG. 3A shows a case where an anchor PRB and non-anchor paging PRBs are included in a paging PRB, it is only necessary to configure offset values for N−1 non-anchor paging PRBs in SIB 2. If non-anchor paging PRBs alone are included in a paging PRB, offset values for N non-anchor paging PRBs are configured in SIB 2.

FIG. 3B is a diagram to show the location of each non-anchor paging PRB, relative to the anchor PRB, on the frequency axis, and, in FIG. 3B, the direction indicated by the arrow is the direction where the frequency becomes higher. As shown in FIG. 3B, non-anchor paging PRBs are located on both sides of the anchor PRB. However, this is by no means a limitation, and non-anchor paging PRBs may be located on the same side of the anchor PRB—for example, on the higher frequency side or the lower frequency side with respect to the anchor PRB.

Referring back to FIG. 2, in step S220, information that specifies non-anchor paging PRBs that are associated with an anchor PRB is transmitted in the anchor PRB.

As mentioned earlier, the number of paging PRBs and offset values for non-anchor paging PRBs may be transferred via SIB 2, and, in this case, information that specifies non-anchor paging PRBs that are associated with an anchor PRB is transmitted by sending SIB 2 in the anchor PRB. However, a person skilled in the art should understand that the base station may also transmit the information specifying non-anchor paging PRBs that are associated with an anchor PRB by using a different piece of information that may be transferred in the anchor PRB. What specific information is used to transmit the information specifying non-anchor paging PRBs that are associated with an anchor PRB may be determined in advance between the base station and the UE.

The base station transmits SIB 2 in anchor PRBs on a regular basis, and the number of paging PRBs and offset values for non-anchor paging PRBs included in SIB 2 may vary every transmission. By receiving the above SIB 2 on a regular basis, the UE can update the information related to paging PRBs dynamically, even when the same anchor PRB is used.

Figure 4:
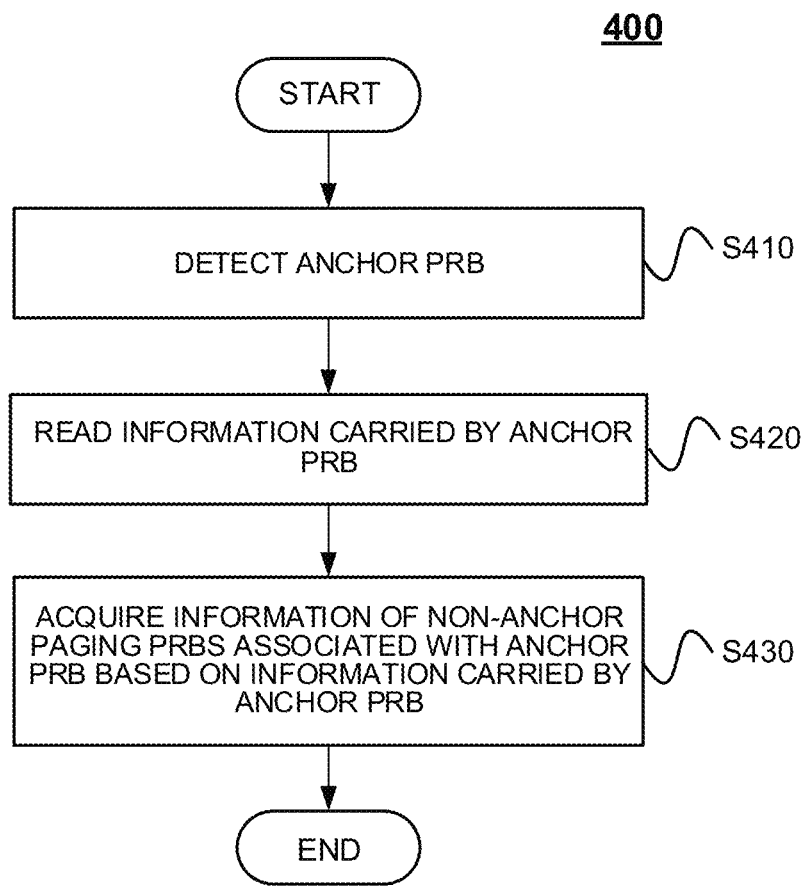
FIG. 4 is a schematic flowchart to show a method of allowing UE to acquire information about paging PRBs, according to the first embodiment of the present disclosure.

FIG. 4 is a schematic flowchart to show a method 400 for allowing UE to acquire information about paging PRBs, according to the first embodiment of the present disclosure.

As shown in FIG. 4, in S410, the UE detects an anchor PRB. For example, the UE may determine the frequency location of an anchor PRB by detecting anchor PRB from the primary synchronization signal (PSS)/secondary synchronization signal (SSS). Since the UE can detect the anchor PRB using any method that is already known in this field, its description will be omitted here.

In S420, the UE reads the information carried by the anchor PRB. In the first embodiment, the base station transmits the number of paging PRBs and offset values for non-anchor paging PRBs in SIB 2, so that the UE can read SIB 2 carried in the anchor PRB. In another embodiment, if it is determined in advance between the base station and the UE that the number of paging PRBs and offset values for non-anchor paging PRBs are transferred using another piece of information in the anchor PRB, the UE may read this piece of information.

In S430, the UE acquires information about the non-anchor paging PRBs associated with the anchor PRB based on information carried by the anchor PRB. To be more specific, the UE acquires the number of paging PRBs and offset values for non-anchor paging PRBs from SIB 2, and these offset values are the offset values of non-anchor paging PRBs with respect to a reference frequency. The offset values and the reference frequency are the same as those described with reference to FIG. 2 in the above text, and its description will be omitted here for the sake of simplicity.

The UE can calculate the location (frequency location) of each non-anchor paging PRB based on the reference frequency and the offset value of each non-anchor paging PRB. Since the frequency location of the anchor PRB is already determined, whether paging PRBs are configured in advance so that an anchor PRB and non-anchor paging PRBs such as those described above are included, or configured so that non-anchor paging PRBs alone are included, the UE can still know all the paging PRBs in the system.

Figure 5:
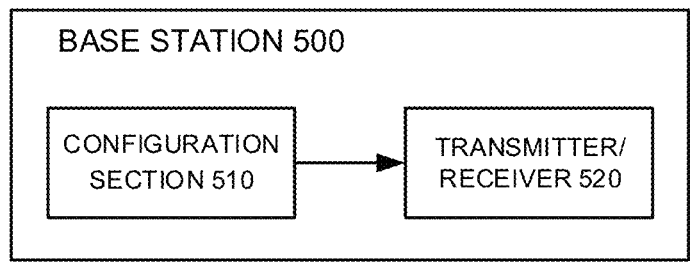
FIG. 5 is a schematic block diagram to show the structure of a base station according to the first embodiment of the present disclosure.

Now, the base station according to the first embodiment of the present disclosure will be described below. FIG. 5 is a schematic block diagram to show the structure of a base station 500 according to the first embodiment of the present disclosure. This base station executes the method shown in FIG. 2.

As shown in FIG. 5, the base station 500 includes a configuration section 510 and a transmitter/receiver 520. Note that, although FIG. 5 only shows elements that are closely related to the embodiment of the present disclosure in the base station 500, these are only illustrative, and the base station 500 may include other elements as well, on an as-needed basis. Note that, since the details of the operations performed by the configuration section 510 and the transmitter/receiver 520 are partly the same as the details described above with reference to FIG. 2, the same details will not be described here again.

The configuration section 510 configures information that specifies non-anchor paging PRBs that are associated with an anchor PRB. To be more specific, the configuration section 510 may place the number of paging PRBs and offset values for non-anchor paging PRBs, in the information (for example, SIB 2) specifying non-anchor paging PRBs that are associated with an anchor PRB. An offset value here is the offset value of a non-anchor paging PRB with respect to a reference frequency. The reference frequency may be the frequency of the anchor PRB, the frequency of the DC tone, or another frequency. The details of the offset values and the reference frequency are the same as those described with reference to FIG. 2 in the above text, and therefore their detailed description will be omitted here for the sake of simplicity.

The transmitter/receiver 520 transmits the information specifying non-anchor paging PRBs associated with the anchor PRB, in the anchor PRB. For example, when transferring the number of paging PRBs and offset values for non-anchor paging PRBs using SIB 2, the transmitter/receiver 520 transmits information that specifies the non-anchor paging PRBs associated with the anchor PRB by sending SIB 2 in the anchor PRB.

Figure 6:
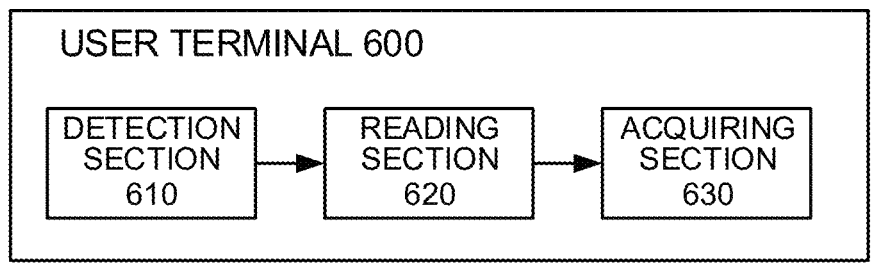
FIG. 6 is a schematic block diagram to show the structure of UE according to the first embodiment of the present disclosure.

Now, UE according to the first embodiment of the present disclosure will be described below. FIG. 6 is a schematic block diagram to show the structure of UE according to the first embodiment of the present disclosure.

As shown in FIG. 6, UE 600 includes a detection section 610, a reading section 620, and an acquiring section 630. Note that, although FIG. 6 only shows elements that are closely related to the embodiment of the present disclosure in the user equipment 600, these are only illustrative, and the user equipment 600 may include other elements as well, on an as-needed basis.

The detection section 610 detects the anchor PRB. For example, the detection section 610 may determine the frequency location of an anchor PRB by detecting anchor PRB from the primary synchronization signal (PSS)/secondary synchronization signal (SSS).

The reading section 620 reads the information carried by the anchor PRB. In the first embodiment, the base station transmits the number of paging PRBs and offset values for non-anchor paging PRBs, in SIB 2, so that the reading section 620 reads SIB 2 carried in the anchor PRB. In another embodiment, if it is determined in advance between the base station and the UE that the number of paging PRBs and offset values for non-anchor paging PRBs are transferred using another piece of information in the anchor PRB, the reading section 620 may read this piece of information.

The acquiring section 630 acquires information about non-anchor paging PRBs associated with the anchor PRB based on information carried by the anchor PRB. To be more specific, the acquiring section 630 acquires the number of paging PRBs and offset values for non-anchor paging PRBs from information carried by the anchor PRB (for example, SIB 2), and these offset values are the offset values of non-anchor paging PRBs with respect to a reference frequency. The offset values and the reference frequency are the same as those described with reference to FIG. 2 in the above text, and its description will be omitted here for the sake of simplicity.

It should be understood that, according to the first embodiment, the base station determines the locations of the non-anchor paging PRBs by transmitting the offset values of the non-anchor paging PRBs with respect to a reference frequency, but this is by no means limiting. In a variation of the first embodiment, the base station may directly transmit the frequency locations of non-anchor paging PRBs without transferring offset values with respect to the reference frequency.

According to the first embodiment described above, the base station specifies information about paging PRBs (non-anchor paging PRBs) explicitly to the UE. According to a second embodiment of the present disclosure, the UE determines paging PRBs by itself based on predetermined rules.

Now, the method of indicating paging PRBs to UE according to the second embodiment of the present disclosure will be described below.

The method of allowing a base station to indicate information about paging PRBs to UE according to the second embodiment of the present disclosure is shown in a schematic flowchart that is similar to the flowchart shown in FIG. 2, and overlapping parts are not drawn here, for the sake of simplicity, and the reference numerals shown in FIG. 2 are used here on an as-is basis. The difference between the method according to the second embodiment of the present disclosure and the method according to the first embodiment of the present disclosure is that, in S210 of the method according to the second embodiment of the present disclosure, instead of the number of paging PRBs and offset values for non-anchor paging PRBs, a flag to indicate whether non-anchor PRBs are provided as paging PRBs is provided in the information carried by the anchor PRB.

As an example, taking into account that the MIB may be transferred in the anchor PRB, whether or not to arrange non-anchor PRBs as paging PRBs is indicated by configuring flag non_anchor_paging_PRB_flag in the MIB. This flag may be one bit. non_anchor_paging_PRB_flag=0 indicates that non-anchor paging PRBs are provided, while non_anchor_paging_PRB_flag=1 indicates that no non-anchor paging PRB is arranged, but "0" and "1" may be configured to express opposite meanings. Obviously, this is by no means limiting, and it is also possible to indicate whether or not to arrange non-anchor PRBs as paging PRBs by configuring a flag with a different name and length in the MIB.

Next, in step S220, the base station transmits the MIB in the anchor PRB.

Similarly, in the second embodiment, whether or not to include an anchor PRB in paging PRBs may be determined in advance between the base station and the UE. Obviously, every time an anchor PRB is transmitted, whether or not to include the anchor PRB in the corresponding paging PRBs may vary, depending on the agreement between the base station and the UE.

Only information indicating whether or not non-anchor PRBs are provided as paging PRBs is transmitted, and, the base station and the UE arrange the paging PRBs based on predetermined rules provided between the base station and the UE. The predetermined rules may be associations between an anchor PRB and paging PRBs associated with the anchor PRB.

To be more specific, the predetermined rules may be stored in the UE and in the base station in the form of a table, like the look-up table (LUT) shown as Table 1 below. Table 1 assumes the case where the anchor PRB is included in the paging PRB. According to Table 1, when an anchor PRB is determined, based on Table 1, which is stored in advance, the number N of paging PRBs and the offset value of each non-anchor paging PRB are determined, so that each non-anchor paging PRB's location can be determined.

TABLE 1

| No. | Anchor PRB | Number N of paging PRBs | Offset value for non-anchor paging PRB |
|---|---|---|---|
| 1 | A | m | Offset_A1, Offset_A2, . . . , Offset_A (m−1) |
| 2 | B | n | Offset_B1, Offset_B2, . . . , Offset_B (n−1) |
| 3 | C | x | Offset_C1, Offset_C2, . . . , Offset_C (x−1) |
| 4 | D | y | Offset_D1, Offset_D2, . . . , Offset_D (y−1) |
| . . . | . . . | . . . | . . . |

In Table 1, to distinguish between each anchor PRB, A, B, C and D may be each an anchor PRB's indicator, its frequency (Hz), a PRB index, etc. m, n, x and y are natural numbers.

As mentioned earlier, offset values for non-anchor paging PRBs are offset values for non-anchor paging PRBs with respect to a reference frequency. Since these offset values are the same as the offset values that have been described earlier with reference to FIG. 2 and FIG. 3, detailed explanation will be omitted here. Each non-anchor paging PRB's offset value shown in Table 1 may be continuous so that the location of non-anchor paging PRBs on the frequency axis are continuous. Alternatively, each non-anchor paging PRB's offset value shown in Table 1 may be discontinuous so that the locations of non-anchor paging PRBs on the frequency axis are discontinuous. Alternatively, the offset values for non-anchor paging PRBs shown in Table 1 may be partly continuous and partly discontinuous so that the location of non-anchor paging PRB on the frequency axis are partly continuous and partly discontinuous.

Figure 7:
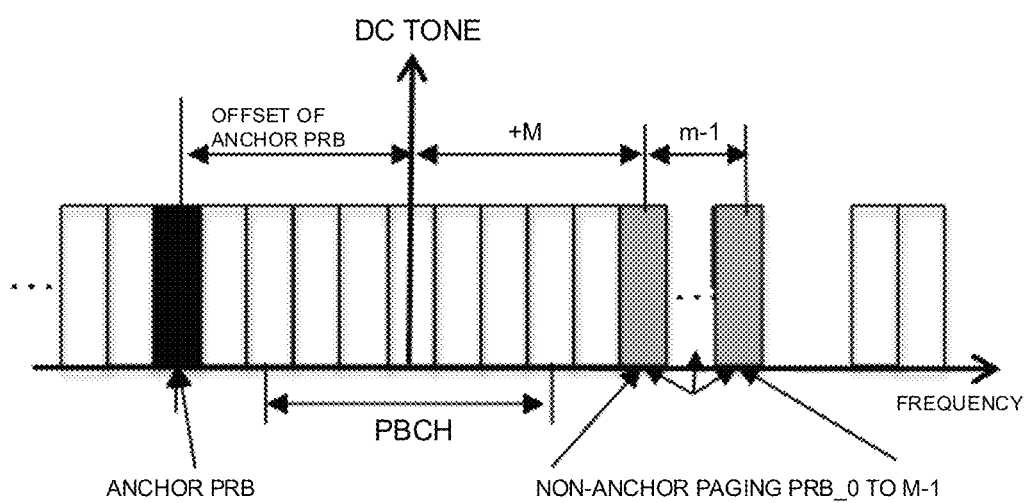
FIG. 7 is a schematic diagram to show arrangement of paging PRBs when the number of paging PRBs is m.

For example, FIG. 7 is a schematic diagram to show arrangement of paging PRBs when the number of paging PRBs is m (that is, the first row in Table 1).

As shown in FIG. 7, non-anchor paging PRB 1 to non-anchor paging PRB m−1 are continuous in frequency, and PRBs where the offset value with respect to the DC tone is "+M" represent non-anchor paging PRBs that are the closest to the DC tone among non-anchor paging PRB 1 to non-anchor paging PRB m−1. In this drawing, M is represented by the number of PRBs between non-anchor paging PRB 1 and the DC tone.

In the case shown in FIG. 7, the first row in Table 1 may be rewritten simpler, as in Table 2 below.

TABLE 2

| No. | Anchor PRB | Number N of Paging PRBs | Offset value for non-anchor paging PRB |
|---|---|---|---|
| 1 | A | m | +(M to M + n−2) |

It should be noted that FIG. 7 is simply an example. Referring to FIG. 7, although the anchor PRB and non-anchor paging PRB 1 to non-anchor paging PRB m−1 are located on both sides of the DC tone, this is by no means a limitation in embodiments of the present disclosure, and the anchor PRB and non-anchor paging PRB 1 to non-anchor paging PRB m−1 may be located on the same side of the DC tone. Alternatively, a part of the anchor PRB and non-anchor paging PRB 1 to non-anchor paging PRB m−1 may be located on the same side of the DC tone, and the other part of non-anchor paging PRB 1-to non-anchor paging PRB m−1 may be located on another side of the DC tone.

Note that as mentioned earlier, non-anchor paging PRB 1 to non-anchor paging PRB m−1 may be dispersed, and, for example, when offset values are expressed using the number of PRBs as the unit, Offset_1 to Offset m−1 may have values such as 2, 4, 7, 11 and so on.

Now, the method of allowing UE to acquire information about paging PRBs according to the second embodiment of the present disclosure will be described below. The method of allowing UE to acquire information about paging PRBs according to the second embodiment of the present disclosure is shown in a schematic flowchart that is similar to the flowchart of FIG. 4 that shows the method of allowing UE to acquire information about paging PRBs according to the first embodiment of the present disclosure, and overlapping parts are not drawn here, for the sake of simplicity, and the reference numerals shown in FIG. 4 are used here on an as-is basis.

The difference between the method of allowing UE to acquire information about paging PRBs according to the second embodiment of the present disclosure and the method according to the first embodiment of the present disclosure is that, when the MIB in the anchor PRB is read in S420 of the second embodiment and the flag to indicate that non-anchor paging PRBs are provided is included in the MIB, information about non-anchor paging PRBs is acquired in S430 based on predetermined rules, as described earlier in the above text, and, finally, the locations of non-anchor paging PRBs are acquired. For example, if an anchor PRB is detected in step S410, referring to Table 1, the number of paging PRBs associated with the anchor PRB and the offset value of each non-anchor paging PRB with respect to a reference frequency are checked, so that the locations of all paging PRBs including each non-anchor paging PRB can be determined.

The structures of the base station and the UE according to the second embodiment of the present disclosure, are similar to the structures shown in FIG. 5 and FIG. 6, so that overlapping parts are not drawn here, for the sake of simplicity, and the reference numerals shown in FIG. 5 and FIG. 6 are used here on an as-is basis.

The base station 500 according to the second embodiment of the present disclosure includes a configuration section 510 and a transmitter/receiver 520.

The configuration section 510 configures information that specifies non-anchor paging PRBs that are associated with an anchor PRB. To be more specific, the configuration section 510 may configure a flag that indicates whether or not non-anchor PRBs are provided as paging PRBs, in the MIB, and this flag is non_anchor_paging_PRB_flag and the like, as described earlier.

In the anchor PRB, the transmitter/receiver 520 transmits information for indicating the non-anchor paging PRBs associated with the anchor PRB. The information to be transmitted may be MIB.

The configuration section 510 determines the non-anchor paging PRBs that are associated with an anchor PRB according to predetermined rules, based on the number of the predetermined paging PRBs and the offset values of the non-anchor paging PRBs with respect to a reference frequency.

The UE 600 according to the second embodiment of the present disclosure includes a detection section 610, a reading section 620 and an acquiring section 630.

The detection section 610 detects an anchor PRB. The detection section 610 executes S410 in FIG. 4, but its description will be omitted here.

The reading section 620 reads the information carried by the anchor PRB. To be more specific, the information which the reading section 620 reads may be the MIB.

The acquiring section 630 acquires information about the non-anchor paging PRBs associated with the anchor PRB based on the information carried by the anchor PPB. To be more specific, the information carried in the anchor PRB (for example, the MIB) includes a flag that indicates whether non-anchor PRBs are provided as paging PRBs. This flag is, for example, non_anchor_paging_PRB_flag of one bit, which has been described above, and, when the flag indicates that non-anchor paging PRBs are provided, the acquiring section 630 acquires information about the non-anchor paging PRBs associated with the anchor PRB based on predetermined rules. For example, when an anchor PRB is detected, referring to Table 1, the number of paging PRBs associated with the anchor PRB and the offset value of each non-anchor paging PRB relative to a reference frequency are checked, and, by this means, the locations of all paging PRBs, including each non-anchor paging PRB, can be determined.

According to the above-described embodiments of the present disclosure, the UE can acquire information about all the paging PRBs that are available for use, including non-anchor paging PRBs, by reading information that is transferred in anchor PRBs.

Note that, while communication is taking place, it is necessary to allocate one or more of these available paging PRBs to the UE, and, meanwhile, the UE needs to know which paging PRBs are allocated to the UE.

Figure 8:
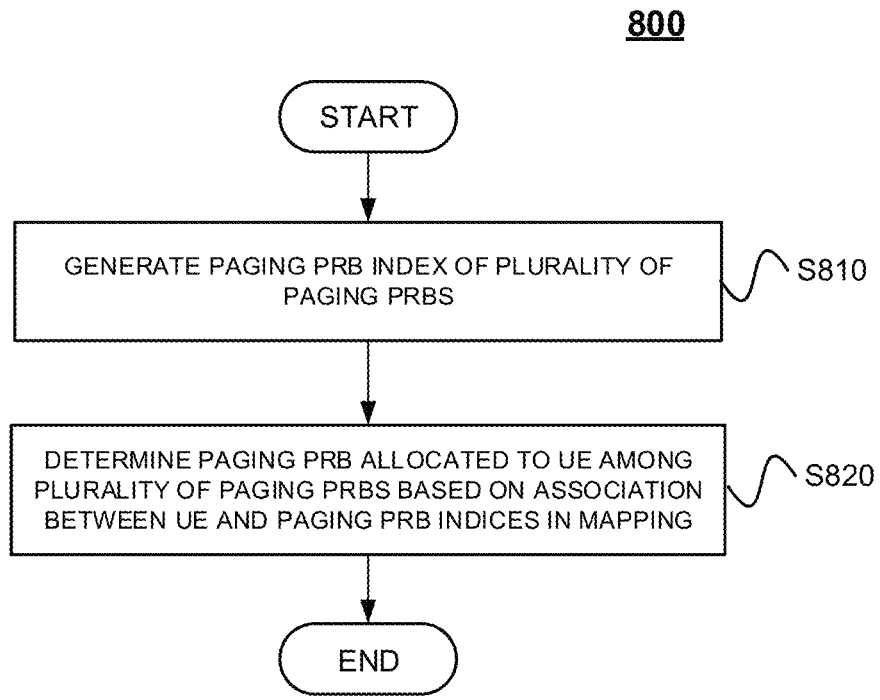
FIG. 8 is a schematic flowchart to show a method of allowing UE to determine allocation of paging PRBs according to an embodiment of the present disclosure.

FIG. 8 is a schematic flowchart to show a method 800 for allowing UE to determine the allocation of paging PRBs according to an embodiment of the present disclosure.

As shown in FIG. 8, in S810, paging PRB indices for a plurality of paging PRBs are generated. The UE may generate paging PRB indices for multiple paging PRBs in either ascending order or descending order of frequency, and, when the number of paging PRBs is N, the paging PRB indices include, for example, Paging_PRB_Index_0 to Paging_PRB_Index_N−1.

In S820, based on associations between the UE and paging PRB indices in mapping, which paging PRBs among the above multiple paging PRBs are allocated to the UE is determined.

To be more specific, in S820, the base station acquires the indicator of the UE (UE_ID) and the number of paging PRBs, N. The UE may acquire N from information transferred in the anchor PRB such as SIB 2. Alternatively, the UE may acquire the number N of paging PRBs arranged for the anchor PRB from the LUT. The UE_ID may be the international mobile subscriber identity (IMSI) or the S-temporary mobile subscriber identity (S-TMSI) of the UE, and, obviously, the UE_ID may be another indicator of the UE, as long as it can uniquely identify the UE, and the embodiment of the present disclosure is not limited to this.

Then, a result in which N is the modulus in UE_ID, that is, UE_ID mod N=ωi, is calculated, and, based on this result (ωi)—to be more specific, based on i, the paging PRB indices are determined.

ω is the weight assigned by the base station, may vary depending on the UE's type or the arrangement of PRBs, and is a positive rational number.

Figure 9:
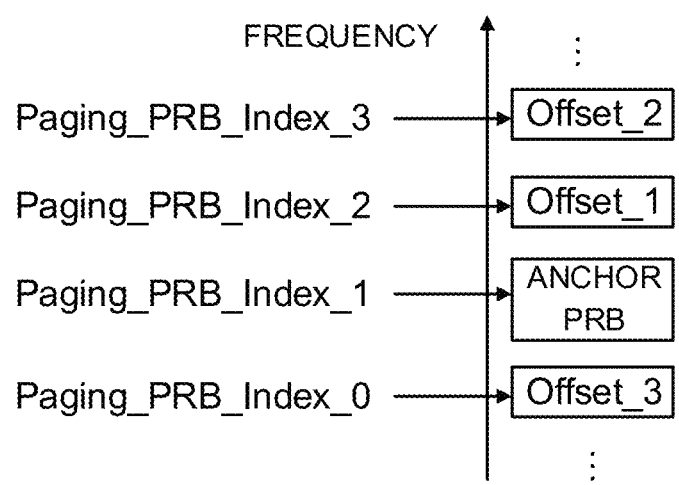
FIG. 9 is a diagram to show examples of paging PRB indices that are assigned.

When ω=1, the result of UE_ID mod N shows the paging PRBs allocated to the UE. FIG. 9 shows examples of paging PRB indices that are assigned when ω=1 holds. FIG. 9 assumes that when N=4 holds, the paging PRBs include an anchor PRB and non-anchor paging PRBs. In the example shown in FIG. 9, the paging PRB indices are generated in ascending order of frequency. Following Table 3 shows corresponding allocation results.

TABLE 3

| i(ω = 1) | Paging PRB index | Corresponding paging PRBs (represented in offsets) |
|---|---|---|
| 0 | Paging_PRB_Index_0 | Offset_2 |
| 1 | Paging_PRB_Index_1 | Offset_1 |
| 2 | Paging_PRB_Index_2 | Anchor PRB |
| 3 | Paging_PRB_Index_3 | Offset_3 |

As illustrated here, when w=1, the four paging PRBs may be allocated to the UE basically with the same probability.

If the load of a given paging PRB (or some of the paging PRBs) is too heavy, or it is desirable to allocate specific paging PRBs to a specific UE, the base station may define ω with another value that is not equal to 1. In this case, the result of UE_ID mod N is divided by weight ω, and the paging PRB indices are determined based on the value i, which is given by dividing the result of UE_ID mod N by the weight, where the weight is assigned by the base station. In this case, the paging PRBs are allocated by configuring ranges for i in advance, so that the value i given by the division based on a weight fits in one of the ranges.

Following Table 4 shows the allocation result in the event of w=2, and N=4. In this case, i=0, ½, 1, and 3/2.

TABLE 4

| Range of i | Paging PRB index | Corresponding paging PRBs (represented in offsets) |
|---|---|---|
| 0 ≤ i < 1 | Paging_PRB_Index_0 | Offset_2 |
| 1 ≤ i < ⅔ | Paging_PRB_Index_1 | Offset_1 |
| ⅔ ≤ i < 2 | Paging_PRB_Index_2 | Anchor PRB |
| i = 2 | Paging_PRB_Index_3 | Offset_3 |

As shown in Table 4 above, assignment of paging PRB indices depends on in what range i that is calculated is included. To be more specific, Paging_PRB_Index_0 is assigned to the UE when i=0 or ½, Paging_PRB_Index_1 is assigned to the UE when i=1, and Paging_PRB_Index_2 is assigned to the UE when if i=3/2. Paging_PRB_Index_3 is never assigned to any UE.

As described above, if ω≠1, multiple paging PRBs are allocated to the UE with different probabilities.

Figure 10:
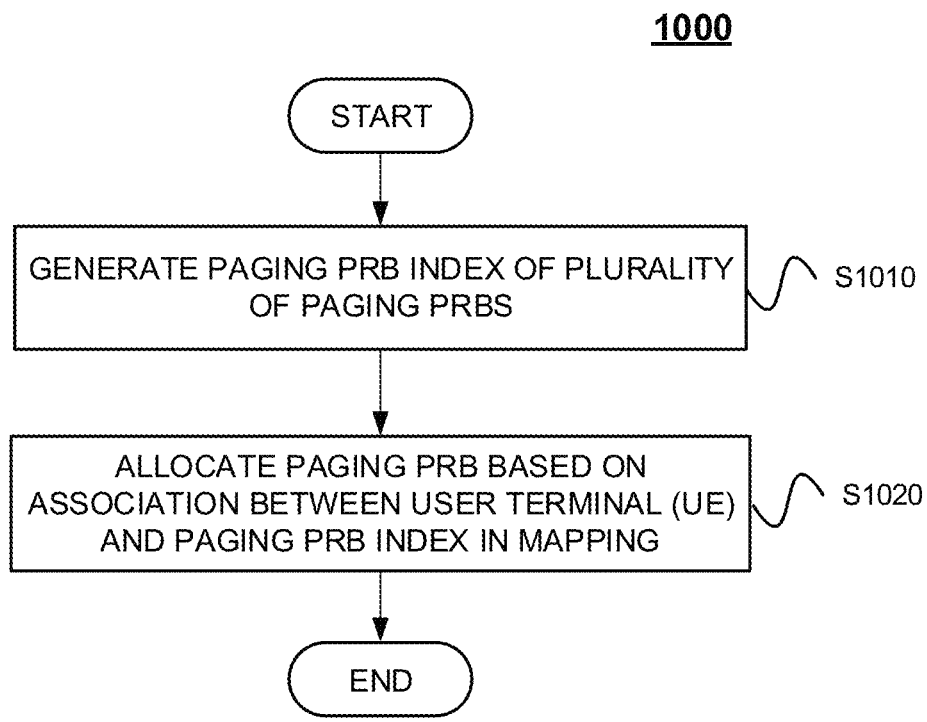
FIG. 10 is a schematic flowchart to show a method of allowing a base station to allocate paging PRBs according to an embodiment of the present invention.

FIG. 10 is a schematic flowchart to show a method 1000 for allowing a base station to allocate paging PRBs, according to an embodiment of the present invention.

As shown in FIG. 10, in S1010, paging PRB indices for a plurality of paging PRBs are generated. The base station may generate the paging PRB indices of multiple paging PRBs either in ascending order or descending order of frequency. If the number of paging PRBs is N, the paging PRB indices include, for example, Paging_PRB_Index_0 to Paging_PRB_Index_N−1.

In S1020, the paging PRBs are allocated based on associations between the UE and the paging PRB indices in mapping.

To be more specific, in S1020, the base station acquires the indicator (UE_ID) of the UE and the number N of paging PRBs. The base station may acquire UE_ID based on any method of choice—for example, the base station may place UE_ID in signaling between the base station and the UE in advance, request the UE to teach its UE_ID, and so on. As mentioned earlier, the UE_ID may be the IMSI or S-TMSI of the UE. Obviously, the UE_ID may be another indicator of the UE, and it is only necessary to uniquely identify the UE, and the embodiments of the present disclosure are not limited thereto. The number of paging PRBs is known in the base station. Then, the base station calculates a result in which N is the modulus in UE_ID, and assigns paging PRB indices based on the result of the calculation.

The assignment of paging PRB indices by the base station based on the result in which N is the modulus in UE_ID is similar to the details described earlier with reference to FIG. 8, FIG. 9, Table 3 and Table 4, and therefore description will be omitted here.

Note that, if ω≠1, the base station divides the result of UE_ID mod N by weight ω, and, based on the value given by dividing the result of UE_ID mod N by the weight, determines the paging PRB indices to assign. As mentioned earlier, ω is assigned by the base station. To be more specific, the base station determines ranges of i in advance, so that the value i given by the division based on a weight fits in one of the ranges.

Figure 11:
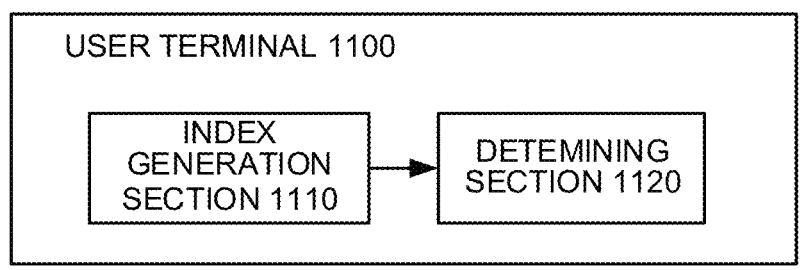
FIG. 11 is a schematic block diagram to show the structure of UE according to an embodiment of the present disclosure.

FIG. 11 is a schematic block diagram to show the structure of UE 1100 according to an embodiment of the present disclosure.

As shown in FIG. 11, the UE 1100 includes an index generation section 1110 and a determining section 1120. Note that, although FIG. 11 only shows elements that are closely related to the embodiment of the present disclosure in the UE 1100, these are only illustrative, and the UE 1100 may include other elements as well, on an as-needed basis.

The index generation section 1110 generates paging PRB indices for a plurality of paging PRBs. The index generation section 1110 may generate the paging PRB indices of multiple paging PRBs either in ascending order or descending order of frequency. If the number of paging PRBs is N, the paging PRB indices include, for example, Paging_PRB_Index_0 to Paging_PRB_Index_N−1.

The determining section 1120 determines which paging PRBs among multiple paging PRBs are allocated to the UE based on associations between the UE and paging PRB indices in mapping.

To be more specific, the determining section 1120 acquires the indicator of the UE (UE_ID) and the number N of paging PRBs, calculates a result in which N is the modulus in UE_ID, and determines the paging PRB indices based on the result of the calculation. Since this process is similar to the details that have been described earlier with reference to FIG. 8, FIG. 9, Table 3 and Table 4, its description will be omitted here.

When $\omega \neq 1$, the determining section 1120 divides the result of UE_ID mod N by weight $\omega$, and, based on the value given by dividing the result of UE_ID mod N by the weight, identifies the paging PRB indices that are assigned. As described above, $\omega$ is assigned by the base station. To be more specific, the determining section 1120 allocates paging PRBs by configuring ranges for i in advance so that the value i given by the division based on a weight fits in one of the ranges.

Figure 12:
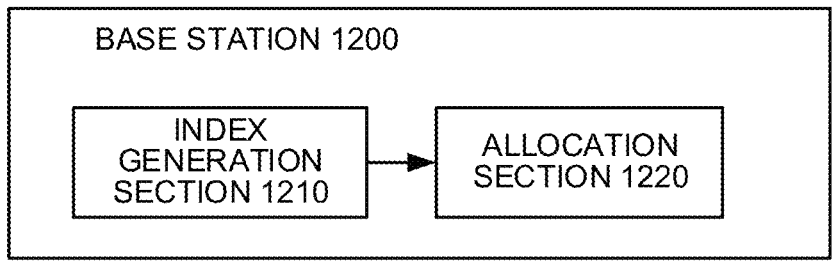
FIG. 12 is a schematic block diagram to show the structure of a base station according to an embodiment of the present disclosure.

FIG. 12 is a schematic block diagram to show the structure of a base station 1200 according to an embodiment of the present disclosure.

As shown in FIG. 12, the base station 1200 includes an index generation section 1210 and an allocation section 1220. Note that, although FIG. 12 only shows elements that are closely related to the embodiment of the present disclosure in the base station 1200, these are only illustrative, and the base station 1200 may include other elements as well, on an as-needed basis.

The index generation section 1210 generates paging PRB indices for a plurality of paging PRBs. The index generation section 1210 may generate the paging PRB indices of multiple paging PRBs either in ascending order or descending order of frequency. If the number of paging PRBs is N, the paging PRB indices include, for example, Paging_PRB_Index_0 to Paging_PRB_Index_N−1.

The allocation section 1120 allocates the paging PRBs based on associations between the UE and paging PRB indices in mapping.

To be more specific, the allocation section 1220 acquires the indicator of the UE (UE_ID) and the number N of paging PRBs, calculates a result in which N is the modulus in UE_ID, and determines the paging PRB indices based on the result of the calculation. Since this process is similar to the details that have been described earlier with reference to FIG. 8, FIG. 9, Table 3 and Table 4, its description will be omitted here.

Note that, when $\omega \neq 1$, the base station divides the result of UE_ID mod N by weight $\omega$, and, based on the value given by dividing the result of UE_ID mod N by the weight, identifies the paging PRB indices to assign. As described above, $\omega$ is assigned by the base station. To be more specific, the allocation section 1220 allocates paging PRBs by configuring ranges for i in advance so that the value i given by the division based on a weight fits in one of the ranges.

According to embodiments of the present disclosure, a base station can allocate paging PRBs to specific UE in multiple paging PRBs that are available for use, and the UE, too, can determine which paging PRBs among the multiple available paging PRBs are allocated to the UE.

Note that, as used herein, the terms "include," "included" or other variations are intended to cover nonexclusive "inclusion," and processes, methods, articles or devices that include a series of elements not only include those elements, but also include other elements that are not explicitly shown, or include elements that are inherently provided in these processes, methods, articles, or devices. When an element is introduced with the phrase to the effect that "one element is provided," unless specified otherwise, in processes, methods, articles or devices including this element, there may be more than one of the same element.

Finally, it should be noted that the above series of processes not only includes processes executed in order of time as described herein, but also includes processes that are executed in parallel or that are executed separately, not in order of time.

According to the above described embodiment, a person skilled in the art knows that the present disclosure may be realized by adding hardware platforms to software wherever appropriate, and that, obviously, the whole of the present disclosure may be realized by hardware alone. This understood, all or part of the technical disclosure of the present disclosure contributing to background art may be realized in the form of a software product, and this computer software product may be stored in a storage medium such as a ROM/RAM, a magnetic disk, an optical disk and so on that contain multiple commands for executing the methods described in each or part of the embodiments of the present disclosure on a single computer device (which may be a personal computer, a server, a network device and so on).

Although the present disclosure has been described above in detail and the specification has described the principles and embodiments of the present disclosure with reference to specific examples, the description of the above-described embodiments is provided only for the purpose of understanding the methods and core concepts of the present disclosure. In addition, a person skilled in the art can also make changes to specific embodiments and the range of application based on concepts of the present disclosure, and specifically, it should be understood that the contents of this specification are not intended to limit the present disclosure.

The invention claimed is:

1. A terminal for NB-IoT, comprising
   a receiver that receives information about non-anchor carriers that are associated with an anchor carrier,
   wherein the receiver receives a paging configuration for the non-anchor carriers,
   wherein a paging resource is determined based on a number of paging resources allocated to the terminal and an indicator for identifying the terminal and is determined by using an index obtained using a weight of the paging resource, and
   wherein a carrier frequency of the non-anchor carriers is indicated by an offset for the non-anchor carriers to a specific frequency, and information regarding the carrier frequency is included in the paging configuration.

2. The terminal according to claim 1, wherein information about the paging configuration for the non-anchor carriers is received in an SIB.

3. A radio base station that communicates with a terminal for NB-IoT, the radio base station comprising a transmitter that transmits information about non-anchor carriers that are associated with an anchor carrier,
  wherein the transmitter transmits a paging configuration for the non-anchor carriers,
  wherein a paging resource is determined based on a number of paging resources allocated to the terminal and an indicator for identifying the terminal and is determined by using an index obtained using a weight of the paging resource, and
  wherein a carrier frequency of the non-anchor carriers is indicated by an offset for the non-anchor carriers to a specific frequency, and information regarding the carrier frequency is included in the paging configuration.

4. A radio communication method for a terminal for NB-IoT and a radio base station, the radio communication method comprising:
  transmitting, by the radio base station, information about non-anchor carriers that are associated with an anchor carrier, to the terminal; and
  transmitting, by the radio base station, a paging configuration for the non-anchor carriers,
  wherein a paging resource is determined based on a number of paging resources allocated to the terminal and an indicator for identifying the terminal and is determined by using an index obtained using a weight of the paging resource, and
  wherein a carrier frequency of the non-anchor carriers is indicated by an offset for the non-anchor carriers to a specific frequency, and information regarding the carrier frequency is included in the paging configuration.

* * * * *